United States Patent
McDonald, Jr. et al.

(10) Patent No.: US 11,623,592 B2
(45) Date of Patent: Apr. 11, 2023

(54) RESILIENT FRONT PROTECTIVE VEHICLE DEVICE HAVING AERODYNAMIC BENEFIT

(71) Applicant: Ridge Corporation, Pataskala, OH (US)

(72) Inventors: Raymond Augustus McDonald, Jr., Pooler, GA (US); Gary Alan Grandominico, Galena, OH (US); Bret Jameson Moss, Lewis Center, OH (US); Crystal Hill, Columbus, OH (US)

(73) Assignee: RIDGE CORPORATION, Pataskala, OH (US)

( * ) Notice: Subject to any disclaimer, the term of this patent is extended or adjusted under 35 U.S.C. 154(b) by 115 days.

(21) Appl. No.: 17/074,446

(22) Filed: Oct. 19, 2020

(65) Prior Publication Data

US 2021/0114539 A1 Apr. 22, 2021

Related U.S. Application Data

(60) Provisional application No. 62/923,065, filed on Oct. 18, 2019.

(51) Int. Cl.
*B60R 19/18* (2006.01)
*B60R 19/02* (2006.01)
*B60R 19/03* (2006.01)
*B62D 35/00* (2006.01)

(52) U.S. Cl.
CPC ............ *B60R 19/18* (2013.01); *B60R 19/023* (2013.01); *B60R 19/03* (2013.01); *B62D 35/001* (2013.01); *B62D 35/008* (2013.01)

(58) Field of Classification Search
CPC ....... B60R 19/18; B60R 19/023; B60R 19/03; B62D 35/008; B62D 35/001
See application file for complete search history.

(56) References Cited

U.S. PATENT DOCUMENTS

| | | | |
|---|---|---|---|
| 4,457,550 A | 7/1984 | Gielow et al. | |
| 4,560,195 A | 12/1985 | Price et al. | |
| 4,703,970 A | 11/1987 | Gorka | |
| 2008/0061597 A1 | 3/2008 | Reiman | |
| 2017/0088195 A1 | 3/2017 | Henderson et al. | |

OTHER PUBLICATIONS

International Search Report and Written Opinion for International Application No. PCT/US2020/056375 dated Feb. 2, 2021.

*Primary Examiner* — D Glenn Dayoan
*Assistant Examiner* — Melissa Ann Bonifazi
(74) *Attorney, Agent, or Firm* — Dinsmore & Shohl, LLP; James J. Pingor

(57) ABSTRACT

A protective device structure for a vehicle is provided that includes an outer surface or shell attached to or otherwise disposed upon a vehicle that covers a top edge of a vehicle to absorb impact. The protective device can include a compressible portion disposed in a cavity defined between the outer shell and the vehicle proximate to the top front wall of the vehicle.

19 Claims, 12 Drawing Sheets

RESILIENT FRONT PROTECTIVE VEHICLE DEVICE HAVING AERODYNAMIC BENEFIT

CROSS-REFERENCE TO RELATED APPLICATIONS

This application claims the benefit of U.S. Provisional Patent Application Ser. No. 62/923,065 entitled "PROTECTIVE DEVICE" filed on Oct. 18, 2019, the entirety of which is incorporated herein by reference.

TECHNICAL FIELD

The innovation relates to a resilient and protective device for cargo transportation vehicles that can also reduce vehicle aerodynamic resistance.

BACKGROUND

Currently, in many cargo carrying vehicles, either self-propelled or towed, the construction of the cargo hold is such that there are two adjacent side wall assemblies and a roof assembly that converge with a rear facing wall and a front facing wall opposite the rear facing wall. The cargo transportation vehicle or hold is essentially a rectangular box. The corner assemblies that adjoin the wall assembly with the roof as well as the leading edge(s) (and trailing edge(s)) of the cargo container are prone to damage from collisions during transportation with tree branches or other objects as well as collisions with other cargo transportation vehicles or permanent structures during storage/parking (e.g., at cross dock or other parking type areas). This damage to the cargo transportation vehicle can incur significantly more expense than just repair costs to the vehicle itself as the damage to a corner assembly can allow water or other elements to intrude into the cargo hold. Introduction of water or other elements into the cargo hold may cause damage or destruction to the freight, potentially on multiple loads, which must then be replaced.

In addition, as is known in the industry, the large flat rectangular surface area of the vehicle also produces significant aerodynamic drag on the vehicle system, resulting in lowered fuel economy and greater cost. Devices have been introduced to the market in an effort to improve aerodynamics, but they are costly and easily damaged during regular use.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, a vehicle protective device is disclosed that is configured to cover a top leading edge of a vehicle body to provide protection from impacts and that may function to absorb and dissipate impact energy. In other aspects, the technology disclosed and claimed herein can further be applied to the lower leading edge, the trailing (rear) edge(s) or even vertical edges of the vehicle body. It is to be understood that in most instances, the vehicle body is a cargo transportation vehicle or cargo container.

In another aspect of the innovation, the vehicle protective device, when installed, provides an aerodynamic shape to a top leading edge of the vehicle thereby facilitating lower aerodynamic resistance resulting in enhanced fuel efficiency. Embodiments employ resilient materials that enable the device's shell to regain (or substantially regain) its original shape and orientation upon alleviation of impact.

According to another aspect, the innovation provides a protective device (e.g., a resilient protective cover) for the front of a vehicle (e.g., a cargo transportation system). The protective device, upon impact, can disperse energy across the surface of a vehicle (e.g., the front corner assembly and top or upper edge) that is prone to damage from collision or impact. This dispersion of energy can provide protection (or mitigation) from extensive damage to the vehicle and/or cargo.

In another aspect of the innovation, a protective device for a vehicle is provided that includes an outer shell (or housing) attached to a top front wall/edge (front plane) of a vehicle and a compressible portion or core disposed in a space (or void) defined between the outer shell and the vehicle proximate to the top front edge of the vehicle. As will be understood, the compressible core can enhance energy dissipation upon impact with a foreign object.

In still another embodiment, the protective device may include a protective outer shell comprising a resilient material, e.g., plastic, fiberglass, metal or composite. The resilient material may operate as a spring type system. The resilient protective cover may also include an energy absorbing foam, other core material, or a mechanical dampening device. The energy absorbing core material or mechanical dampening device may disperse the energy generated from impact or a blow of a collision to protect the vehicle from damage.

In yet another embodiment, the protective device may include an enclosed device comprising a material that can substantially compress between two colliding surfaces so as to absorb impact energy. In one embodiment, the material may return to original form after impact, e.g., creating only elastic deformation instead of permanent deformation in the system.

Further, in embodiments, the shape of the outer shell of the device is such that from the roof section the part extends forward, away from the cargo container, creating a rounded type nose until it returns (e.g. convexly) downward towards the front wall assembly. The shape of the outer shell extends longitudinally across the width of the vehicle front or leading edge. Additionally, the device may wrap around the corner sections and extend rearward to provide protection from sideward impacts.

In one embodiment, the device may include foam inside the outer shell shaped to conform to the front nose portion of the device and terminating with a blunt surface at the rear to mate with the front wall of the cargo system. This foam can conform to the top rail or other complex geometry that may be present in the area of the cargo transportation system to create a snug fit.

Still further, the device may be attached to the vehicle without the use of rigid fasteners. This attachment mode may facilitate absorption of impact energy. In one configuration, the lower horizontal length of the device is the single attachment to the front wall of the vehicle. Here, the existing reinforcement posts (e.g., four or five posts) can provide rigid attachment locations for the device.

As will be described infra, the device may be employed at the front assembly of the vehicle as a protection device (e.g., from inadvertent strikes with trees) and/or at the rear frame of the vehicle (e.g., from inadvertent strikes with docks). In addition to the use on the leading and trailing horizontal edges of the vehicle, the device may be designed and employed in a vertical configuration at the front and/or rear of the vehicle near the corner assemblies.

In addition to the protection features, function and benefits of the device, the innovation may be configured into an aerodynamic structure that reduces aerodynamic resistance of a vehicle (e.g., a cargo vehicle).

In still yet another aspect of the innovation, a method of absorbing impact and improving aerodynamics on a vehicle is disclosed that includes providing a structure having an outer shell attached to a top, frontal area of the vehicle. In some aspects, a compressible portion or core can be disposed in a space defined between the outer shell and the top front of the vehicle that absorbs energy from objects that impact the outer shell, e.g., while the vehicle is in motion, and improves aerodynamics of the vehicle while the vehicle is in motion.

In still yet another aspect of the innovation, the outer shell attached to a front edge of a vehicle comprises of a surface of adequate size, oriented in a top vertical plane at an angle from the sidewalls of the cargo body in order to install compliant lighting, e.g., according to federal regulations.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
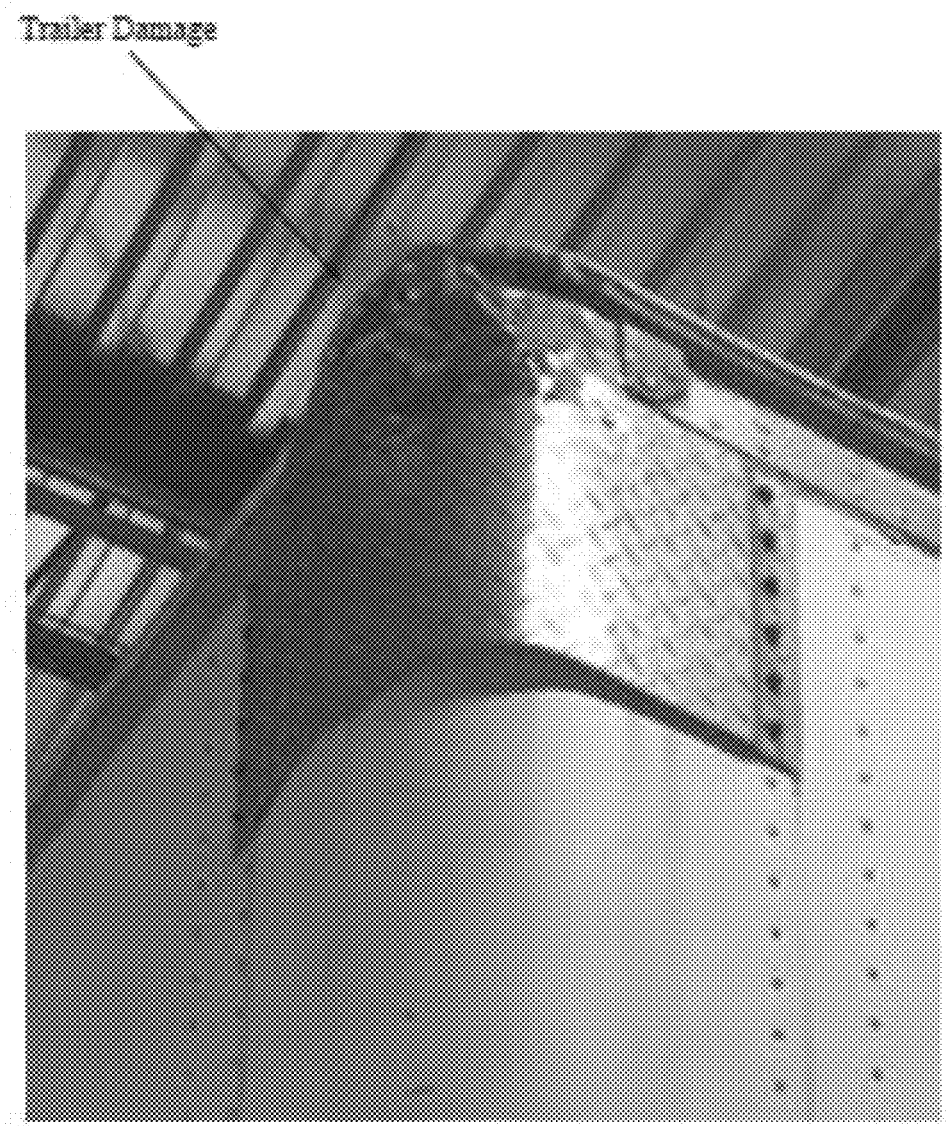
FIG. 1 is a view of a vehicle having damage to a top front corner of the vehicle.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., materials, thickness, orientation, configuration, etc.), it is to be understood that the features, functions and benefits of the innovation can employ characteristics that vary from those described herein. These alternatives are to be included within the scope of the innovation and claims appended hereto.

Conventional attempts to mitigate damage to cargo containers have been heavy, cumbersome devices that, when damaged, needed to be replaced. FIG. 1 illustrates heavy diamond plated corner protectors that have been conventionally used to protect the corners of a cargo vehicle or container.

The innovation disclosed and claimed herein is a new and novel protective device that employs a unique structure, configuration and orientation disposed in a way and configured using materials that enhance impact absorption and dispersion. Additionally, in aspects, upon alleviation of impact, the innovation can resiliently regain (or substantially regain) its original shape as well as configuration and orientation.

In embodiments, the protective device may be configured to secure to a front or rear assembly of the vehicle. Attachment upon the vehicle can be designed such that a void (e.g., gap, space) is left to enhance impact absorption. This configuration will be better understood upon a review of the figures that follow. The protective device may include an outer shell/outer surface manufactured of a resilient material that is configured to absorb impact energy resulting from an impact with an object. In one embodiment, the outer shell/outer surface may be integrally formed or permanently attached to a dampening core. In one embodiment, the outer shell/outer surface may be configured to be releasably or removably attached to the core forming the protective device.

Figure 2:
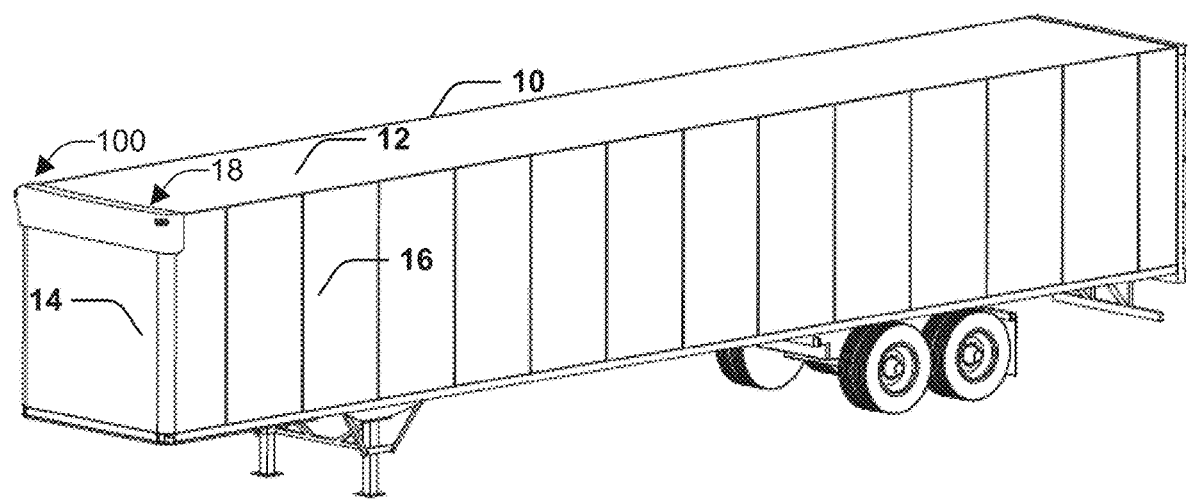
FIG. 2 is a perspective view of a vehicle including an innovative protection device attached to a top leading edge of the vehicle in accordance with an aspect of the innovation.

Referring now to the drawings, FIG. 2 is a perspective view of a vehicle 10 incorporating a protective device 100 in accordance with aspects of the innovation. The vehicle includes a top wall or panel 12, a front wall or panel 14, and a pair of side walls or panels 16. The protective device 100 may include an outer shell 200 and an optional compressible portion 300 (as illustrated in the figures that follow) and is configured to absorb impacts from objects (e.g., tree limbs, other vehicles, docks, etc.) to protect a top, front (leading) edge 18 of the vehicle 10.

In addition to the damage mitigation properties, the protective device 100 can be an aerodynamic structure that is configured to improve aerodynamics thereby increasing fuel efficiency by reducing drag. It is to be appreciated that while FIG. 2 depicts the protective device on a front (leading edge) assembly of a vehicle, the protective device may alternatively or additionally be attached to a rear assembly of the vehicle thereby protecting the rear from similar damage causing situations (e.g., loading docks).

Figure 3:
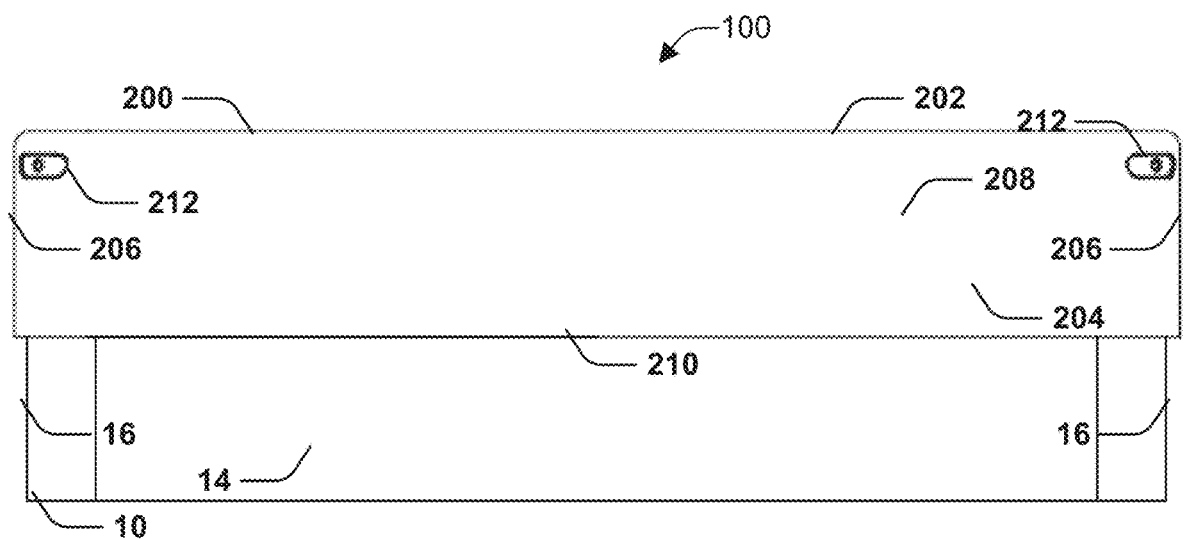
FIG. 3 is a front view of the top leading edge of the vehicle with the innovative protective device in accordance with an aspect of the innovation.

Referring to FIG. 3, the outer shell 200 may be an integrated unit and include a top or upper (first) face 202 configured to attach to (or be positioned upon or cover) the top wall 12, a front or lower (second) face 204 configured to attach to (or otherwise be positioned upon or cover) the front wall 14, a pair of side (third and fourth) faces 206 configured to attach to (or otherwise cover) the pair of side walls 16, and a curved portion 208. The outer shell 200 may be configured to attach to the vehicle 10 with fasteners along a lower edge 210, such as but not limited to, nuts and bolts, screws, rivets, adhesive, etc. As explained in greater detail below, the device 100 can be attached along a lower edge thereby creating a void, gap or space along the sides or top of the unit. This void, gap or space contributes to the impact absorption and energy dissipation of the device.

The outer shell 200 contains a surface oriented on an integral plane at an angle from the cargo system for mounting lights 212, e.g., complying with federal regulations. The outer shell 200 may be made from a sufficiently rigid (yet resilient) material, such as but not limited to, polymer, metal, fiberglass, composites, plastic, rubber, laminations, resins, etc. or combinations thereof.

The device 100 has been developed via multiple wind tunnel tests, impact tests, and full-scale testing and can be manufactured using an RPTM (Rapid Prototype Tool Molding) process. The product is designed to have impact resilience while providing a fuel savings through its unique aerodynamic properties.

In one aspect, the product weighs approximately 50 pounds, and can be painted with a durable, high performance acrylic polyurethane paint or otherwise molded to a desired color. The 0.4 inch thick device or shell can be manufactured from reinforced resin-included impact polymers.

Figure 4:
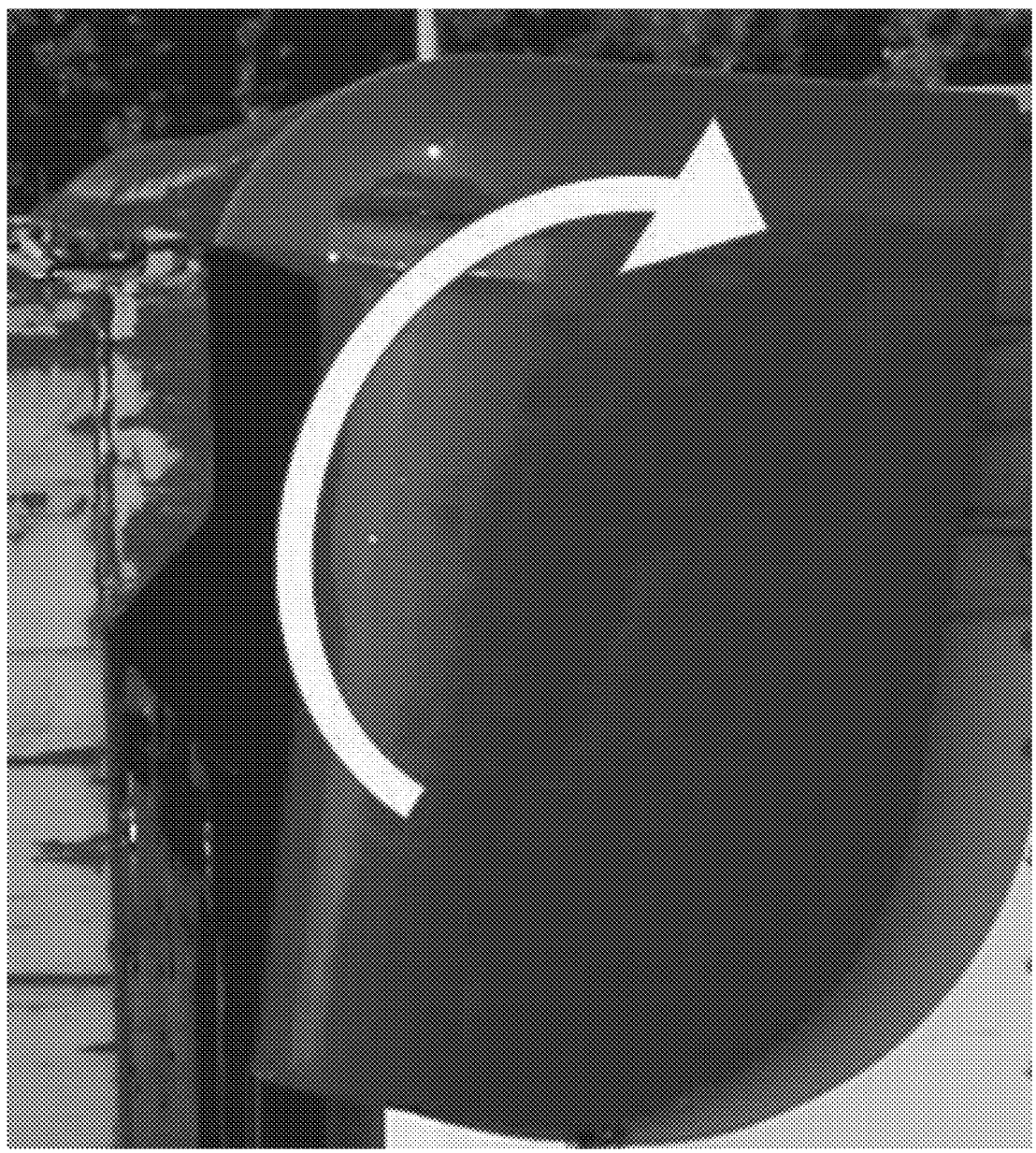
FIG. 4 is an example impact motion (and energy absorption) of a device in accordance with an aspect of the innovation.

The device can fasten through the trailer front wall with bolts (e.g., (4) ⁵⁄₁₆" bolts) at each nose post and can be tightened with a rubber bonded washer and lock nut to ensure a long term, tight, sealed connection. The fastening points (e.g., consistent with the trailer posts) allow the device 100 to deflect rearward and absorb the blows caused by tree limbs or trailer to trailer collisions. An example directional motion of the device upon impact is shown in FIG. 4. As shown and described, because of the unique mounting configuration of the device, upon impact, the rotational deflection is able to occur thereby dissipating and absorbing energy from an impact.

The robust structure of the device not only helps protect the trailer from damage, but ensures an aerodynamic shape after impact (resiliently regaining shape, configuration and orientation).

The device has been tested multiple times in the wind tunnel, exhibiting drag reduction resulting in fuel savings of approximately 0.5% depending on the configuration. Additionally, the device 100 can be designed to accommodate a combination light, with a face molded at a 45° angle for installation of a PC or PC2 clearance/marker light, in compliance with regulations and standards. The light hole(s) can be pre-drilled with knowledge of the light specification and installation guidelines.

In aspects, in order to properly deflect and protect the trailer, the device's design sits approximately 1¾ inches from the sides of the trailer, within the regulatory limit of 3 inches for a non-property carrying device. The device protrudes out approximately 5¾ inches from the front of the trailer, which is allowable through regulations for an aerodynamic device.

Additionally, it is to be appreciated that materials having resilient properties can be employed so as to enhance the ability of the outer shell (and/or compressible portion) to regain (or substantially regain) its original shape, configuration and orientation following an impact. Moreover, it is to be understood and appreciated that alternative means of attaching or positioning the device upon a vehicle can be employed without departing from the spirit and/or scope of the innovation and claims appended hereto.

While the described example is described as not physically engaging a surface (e.g., top, side wall) of the cargo container (e.g., trailer), it is contemplated that other embodiments may employ engagement tolerances that can achieve a desired impact compression and aerodynamic effect/feature. It is to be understood that the intentional clearance or space between the protective device and the trailer can enhance the energy absorption of the device, with or without an impact core as described herein. Accordingly, these alternative embodiments are to be included within the scope of this disclosure.

Figure 5:
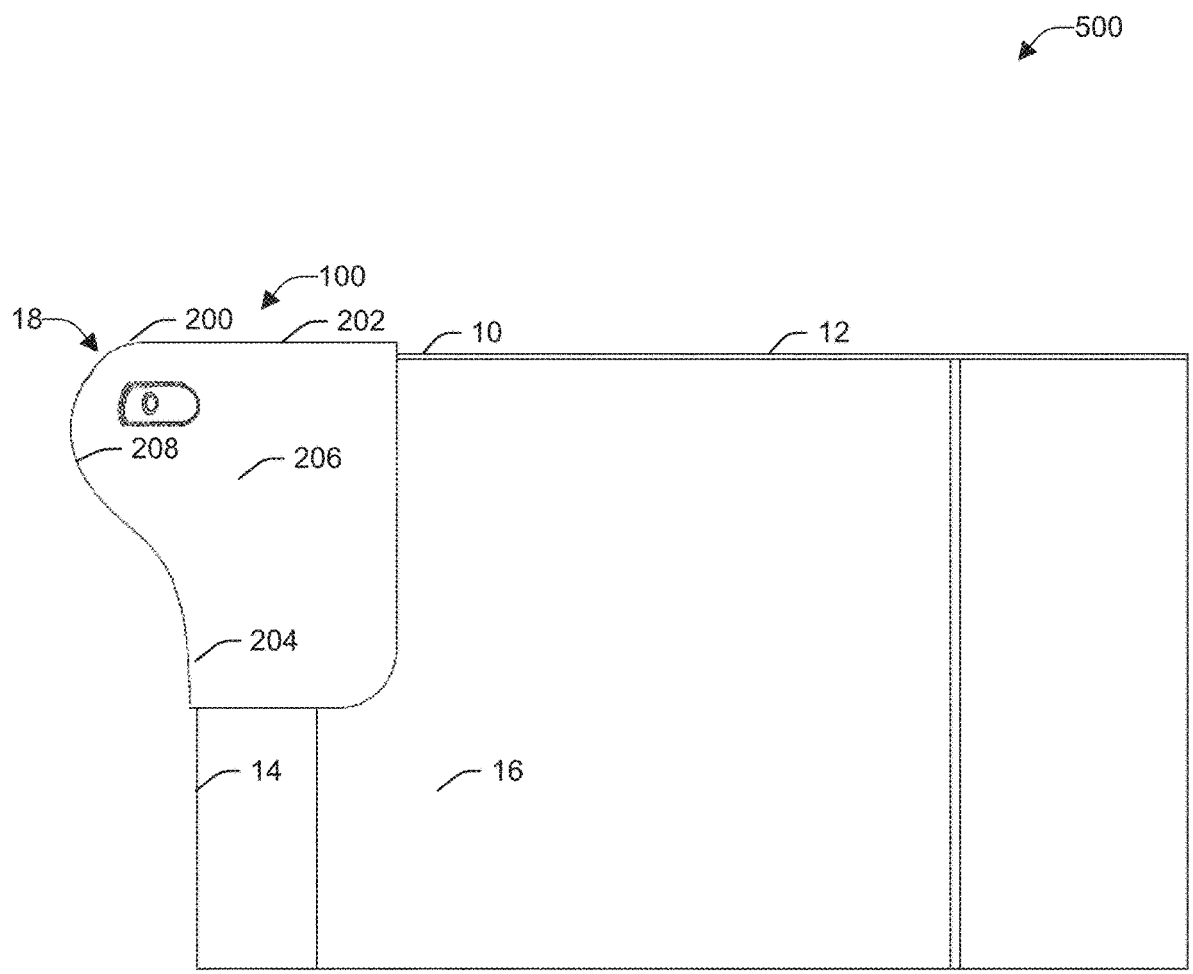
FIG. 5 is a side view of the top leading edge of the vehicle with the innovative protective device in accordance with an aspect of the innovation.

Referring to FIG. 5, the protective device may include curved portion 208 that extends forward, away from the leading (or attachment) face of the vehicle 10. The curved portion 208 may include a C-like shape that covers the top face 202, the front face 204, and the pair of side faces 206 thereby completing the enclosure of the outer shell 200. More specifically, the curved portion 208 is configured to extend outward from the top wall 12 of the vehicle 10 and curve downward and back toward the front 14 of the vehicle 10 to connect to the front face 204 thereby creating a space 210 proximate to the top front (or rear) edge 18 of the vehicle 10 between the curved portion 208 and the front wall 14 of the vehicle 10 when the outer shell 200 is attached to the vehicle 10. While a specific configuration, orientation and shape is shown, it is to be appreciated that alternative shapes exist that are to be included within the spirit and/or scope of the innovation. For example, an alternative device can protrude upward from top wall 12 in an effort to provide additional protection from downward forces in addition to frontal impacts.

In other examples, individual corner protection devices can be disposed upon each of the cargo trailer (e.g., 10) corners thereby protecting the corners individually from impact. These corner impact protection devices (not shown) can be used separately or together with a center thereby enhancing the aerodynamic benefits of the device. It will be appreciated that by segmenting the device into two corner units along with a center portion, should damage occur, replacement costs can be mitigated in lieu of replacing a complete protection device unit should an unlikely impact cause irreparable damage. While irreparable damage is unlikely due to the energy absorption features of the innovation, is it to be understood that irreparable damage can occur which exceed the resilient and energy absorbent characteristics of the innovation.

Figure 6:
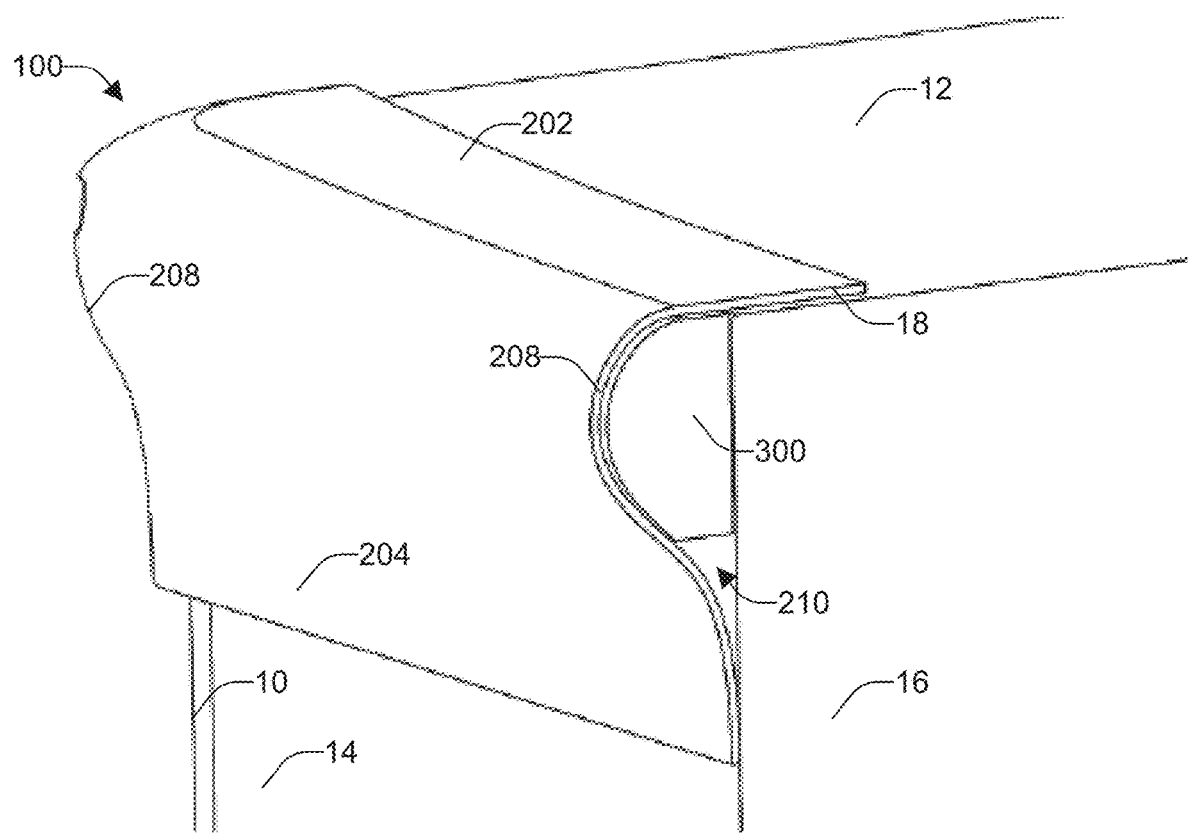
FIG. 6 is a cross-section perspective view of the top leading edge of the vehicle with the innovative protective device having a compressible core in accordance with an aspect of the innovation.

In another embodiment, referring to the cross-sectional view of FIG. 6, a compressible portion or core (e.g., foam, honeycomb) 300, when present, is disposed in the space or void 210 between the curved portion 208 and the front wall 14 of the vehicle 10 and is configured to absorb impact energy from objects. The compressible portion 300 may be most any type of compressible material or mechanical dampening system, such as but not limited to, elastic or viscoelastic foam materials, such as but not limited to, a high density foam, memory foam, rubber, gas spring, etc. In other embodiments, the compressible portion 300 may be a composite of multiple foam layers of various densities and/or thicknesses that may be secured together to produce various impact absorbing energy effects. The compressible portion 300 may be disposed between the curved portion 208 and the front wall 14 of the vehicle 10, for example, with attachment to either to the curved portion 208 or the front wall 14 or alternatively, free-floating/unattached.

Alternatively, the compressible portion 300 may be attached to the curved portion 208 and/or the front wall 14 of the vehicle with a fastening device, such as but not limited to, an adhesive. In other embodiments, the protective device 100 may be a single unit (not shown) made from a compressible material (e.g., foam) and have a structure (e.g., honeycomb) configured to absorb impact energy. It is to be appreciated that, by design, the innovation can be provided to absorb, deflect, or otherwise crush upon impact.

Figure 7:
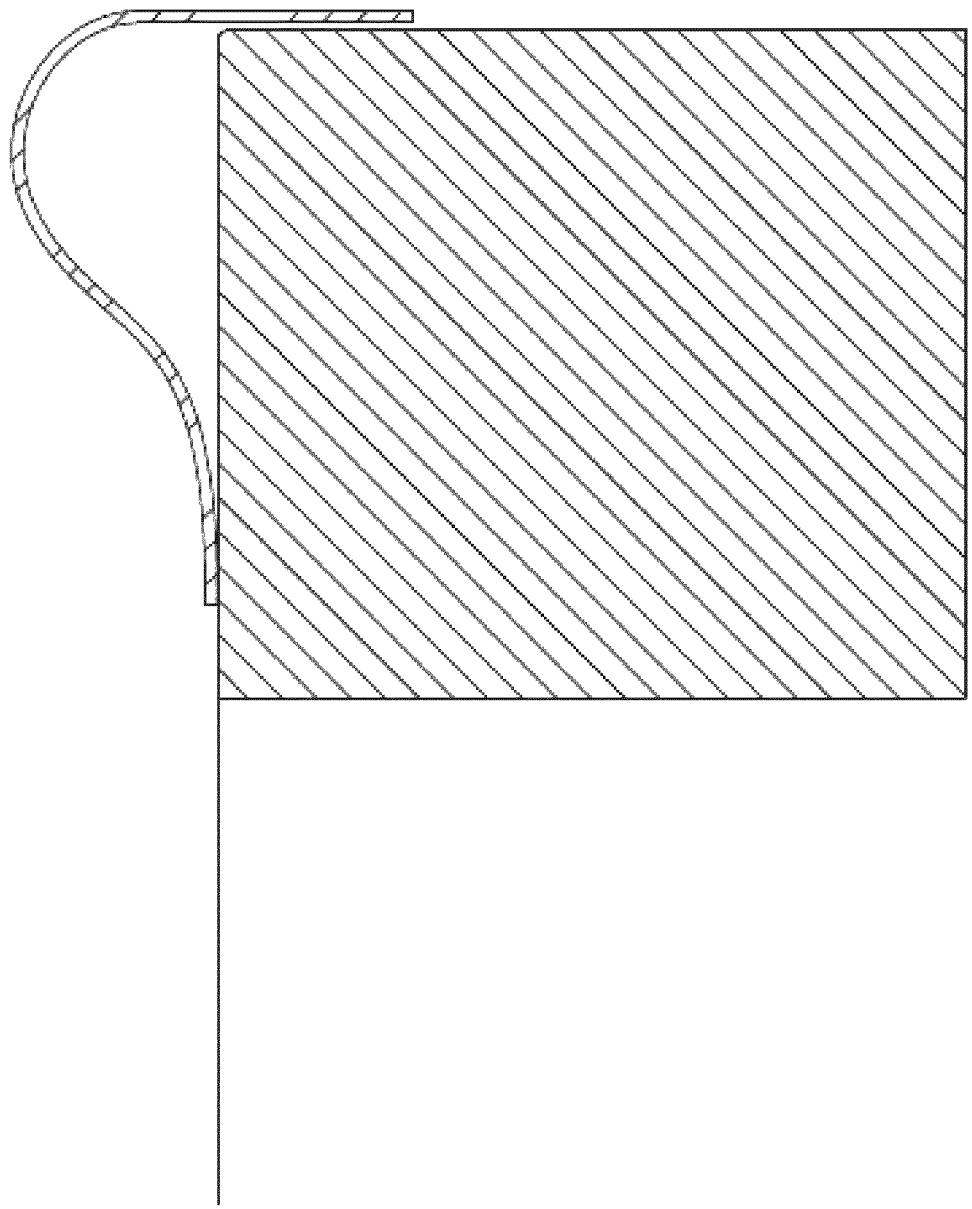
FIG. 7 is a cross-section perspective view of the top leading edge of the vehicle with the innovative protective device without a compressible core in accordance with an aspect of the innovation.

Similarly, aspects can include resilient properties that enable the outer shell 208 of the device 100, and compressible portion 300, to absorb impact energy from a foreign object while returning, or substantially returning, to its original shape upon removal of the foreign object impact. It is to be appreciated that, as shown in FIG. 7, the protective device does not require the use of a compressible portion. In one embodiment without a compressible portion, the outer shell may be configured to absorb impact energy. In one example, the outer shell may configured to flex, wherein the flex of the outer shell may absorb impact energy while returning to (or substantially to) its original shape.

Figure 8:
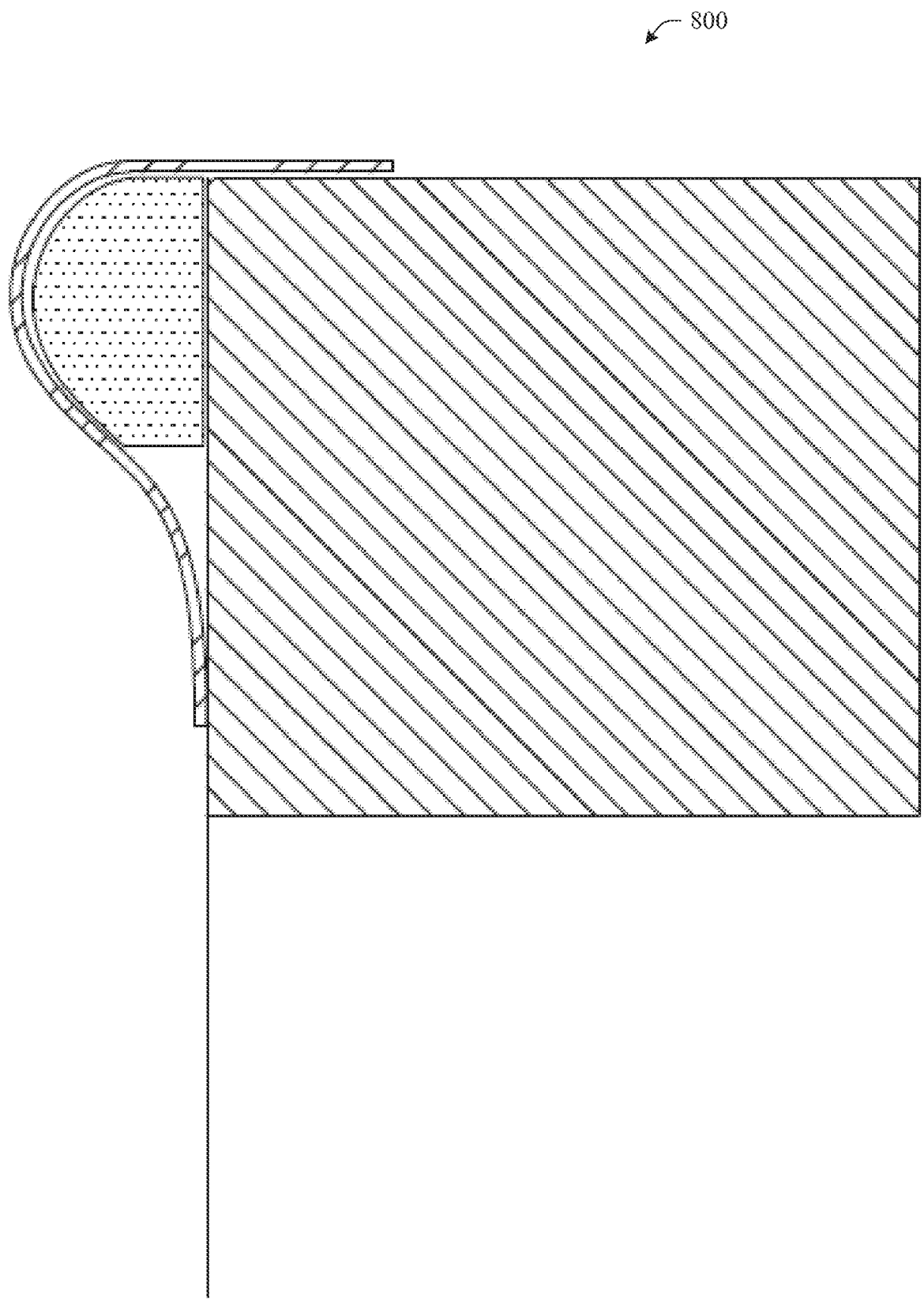
FIG. 8 is a cross-section perspective view of the top leading edge of the vehicle with the innovative protective device having a compressible core in accordance with an aspect of the innovation.

In one embodiment, the protective device may be utilized at either the front or rear assembly (or both) of a vehicle. In one embodiment, the protective device may be used in a vertical configuration at the front and/or rear of the vehicle near the corner assemblies (e.g., top and/or bottom). By contrast, FIG. 8 illustrates a similar device to that of FIG. 7 but including a compressible or reinforcement core.

Figure 9:
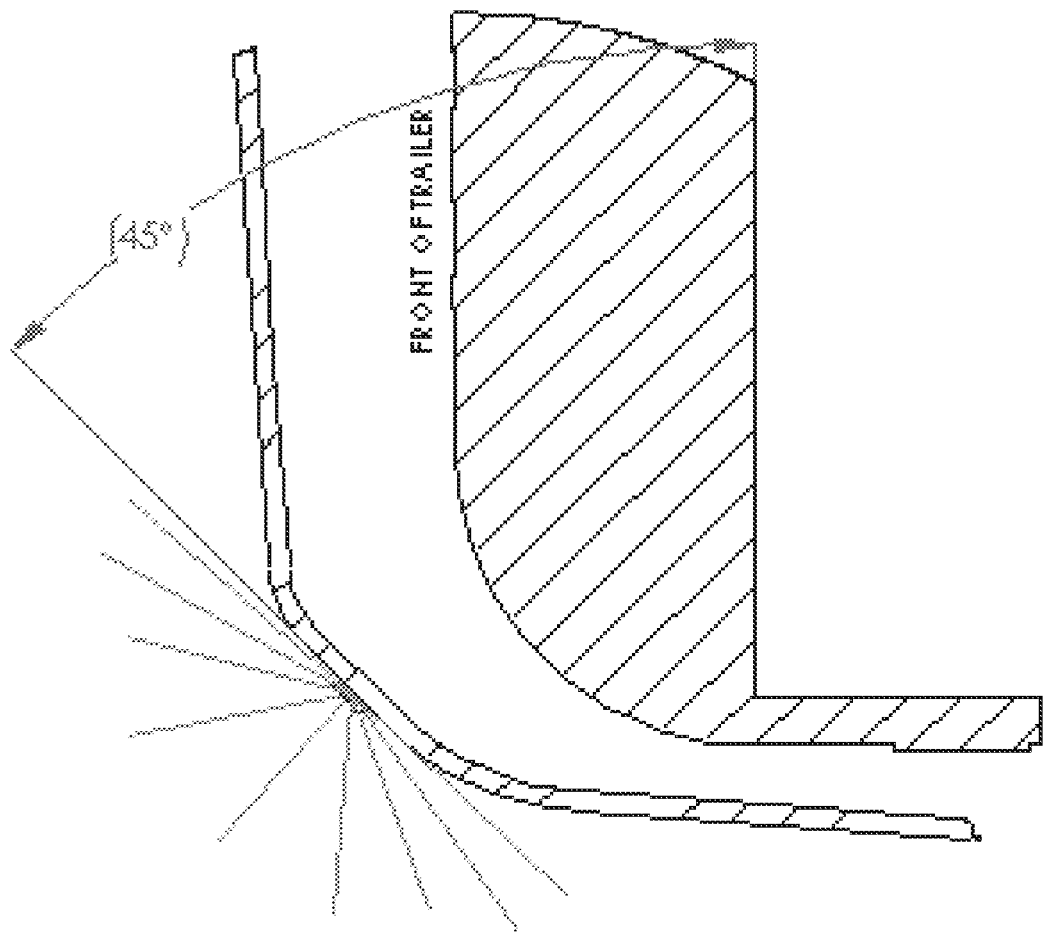
FIG. 9 is a cross-section top down view of the top leading edge of the vehicle with the innovative protective device having lighting provisions in accordance with an aspect of the innovation.

Referring to FIG. 9, the innovation may provide a mechanism having regulatory configurations (e.g., 45 degree angle) for the mounting of lighting. While a specific orientation is illustrated, it is to be appreciated that alternative designs can be employed without departing from the spirit and/or scope of the innovation and claims appended hereto.

Figure 10:
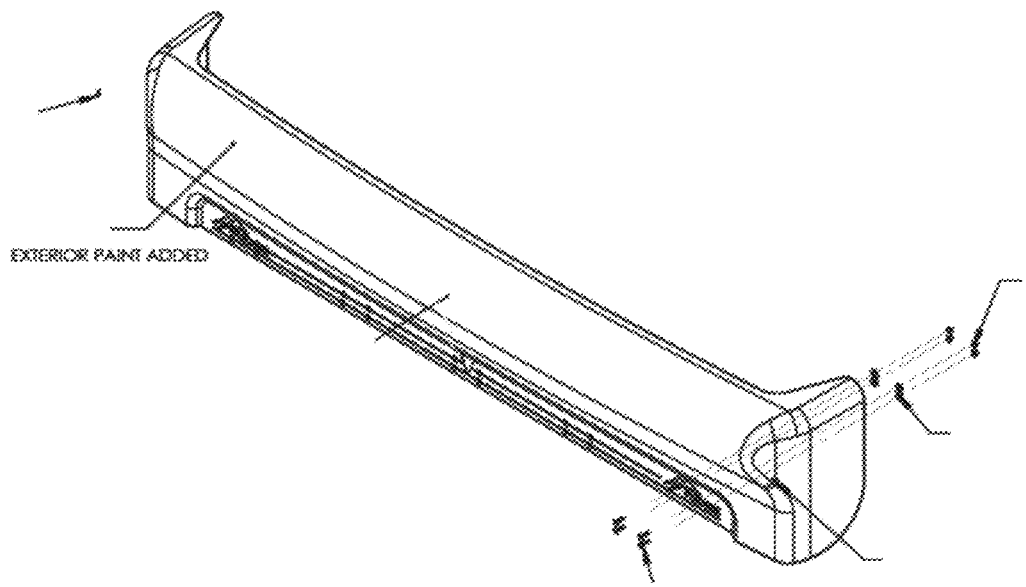
FIG. 10 is a perspective view of the innovative protective device in accordance with an aspect of the innovation.
Figure 11:
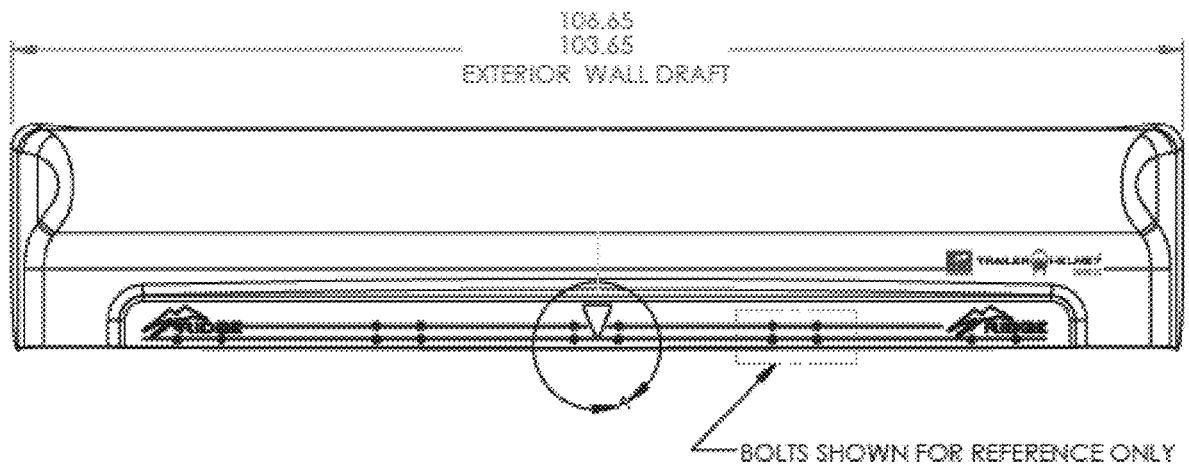
FIG. 11 is a front view of the innovative protective device in accordance with an aspect of the innovation.
Figure 12:
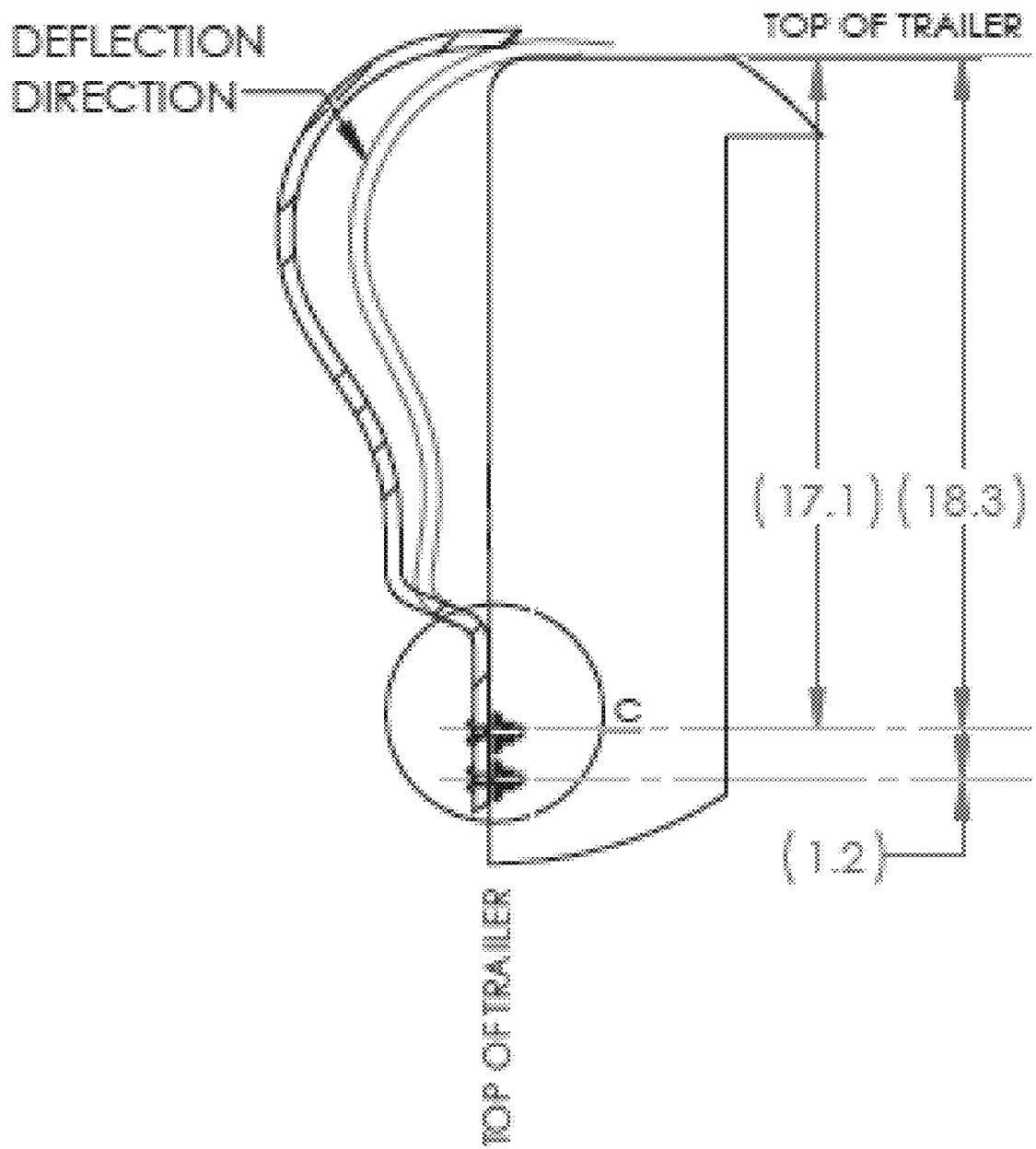
FIG. 12 is a cross-section side view of the top leading edge of the vehicle with the innovative protective device illustrating deflection direction in accordance with an aspect of the innovation.

FIGS. 10 and 11 are provided to illustrate example configurations of a device in accordance with aspects described herein. FIG. 11 specifically illustrates a centerline indicator as well as lower-edge mounting in accordance with aspects as described herein. FIG. 12 illustrates a deflection gap and direction in response to an impact upon the device. It is to be understood that, as shown, the deflection of the device is in a rearward (toward the trailer) direction thereby absorbing energy of an impact. Upon alleviation of the impact, the device regains (or substantially regains) its shape and configuration.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A resilient protective device configured to absorb and dissipate impact energy for use on a cargo vehicle comprising:
    a resilient shell comprising:
        a top face configured to cover a top edge of the cargo vehicle;
        a lower face configured to attach to a front wall of the cargo vehicle;
        an offset portion configured to absorb impact, wherein the offset portion connects the top face and the lower face, creating a cavity between the offset portion and a front plane of the cargo vehicle; and
    wherein the resilient shell is configured to attach solely to the front wall of the cargo vehicle at the lower face, thereby providing rotational deflection capability at the top face and the offset portion.

2. The resilient protective device of claim 1, wherein the resilient shell comprises a resilient plastic.

3. The resilient protective device of claim 1, wherein the resilient shell comprises a composite material.

4. The resilient protective device of claim 1, wherein the resilient shell comprises a metal.

5. The resilient protective device of claim 1, wherein the resilient shell comprises an integral mounting plane at an angle from the cargo vehicle to facilitate mounted lights.

6. The resilient protective device of claim 1, further comprising a compressible portion disposed within the cavity.

7. The resilient protective device of claim 6 wherein the compressible portion comprises an energy absorbent foam.

8. The resilient protective device of claim 6 wherein the compressible portion comprises a plurality of spring devices.

9. The resilient protective device of claim 6 comprising a plurality of horizontal linear segments.

10. The resilient protective device of claim 6 comprising a plurality of vertical linear segments.

11. The resilient protective device of claim 1, further comprising a non-deflective reinforcement element.

12. A protective device for a vehicle comprising:
    a resilient outer shell configured to attach solely to a selected vertical portion of a front plane of a vehicle; and
    a compressible portion disposed in a cavity defined between a curved portion of the resilient outer shell and a top front edge of the vehicle, wherein, upon impact, the protective device rotationally deflects in relation to the sole attachment upon the front plane of the vehicle.

13. The protective device of claim 12, wherein the resilient outer shell includes a top face disposed above a top wall of the vehicle, a front face configured to attach to a front wall of the vehicle solely upon a lower portion, and a pair of side faces configured to cover each side wall of the vehicle.

14. The protective device of claim 13, wherein the resilient outer shell further includes a curved portion configured to extend outward from the top wall of the vehicle and curve downward and back toward a surface of the vehicle when the resilient shell is attached to the vehicle, and wherein the curved portion covers the front face and the pair of side faces.

15. The protective device of claim 12, wherein the resilient outer shell has an aerodynamic shape.

16. The protective device of claim 12, wherein the resilient outer shell comprises an integral mounting plane at an angle from the vehicle to facilitate mounted lights.

17. A structure for a vehicle comprising:
   an outer surface configured to attach solely to a selected vertical portion of a front plane of the vehicle; and to provide impact protection via energy absorption or dissipation with rotational deflection about the selected vertical portion; and
   a compressible portion integral to the outer surface.

18. The structure of claim 17, wherein the outer surface includes a top face configured to engage with a top wall of the vehicle, a front face configured to attach to a wall of the vehicle, and a pair of side faces configured to engage with and in proximity to each side wall of the vehicle, wherein the front face is configured to attach at the selected vertical portion.

19. The structure of claim 18, wherein the outer surface further includes a curved portion that is configured to extend outward from the top wall of the vehicle and curve downward and back toward the vehicle and to connect to the front face and also connects to the pair of side faces thereby enclosing the outer surface and forming an aerodynamic shape.

* * * * *